United States Patent [19]

Knauf et al.

[11] Patent Number: 5,397,851

[45] Date of Patent: Mar. 14, 1995

[54] PROCESS FOR CIS-1,4-POLYBUTADIENE PRODUCTION WITH REDUCED GEL FORMATION

[75] Inventors: Thomas F. Knauf; Akhtar Osman, both of Sarnia, Canada

[73] Assignee: Polysar Rubber Corporation, Sarnia, Canada

[21] Appl. No.: 149,433

[22] Filed: Nov. 9, 1993

[51] Int. Cl.⁶ .......................... C08F 2/06; C08F 4/602
[52] U.S. Cl. .......................... 526/92; 526/93; 526/151; 526/153; 526/340.4
[58] Field of Search ............ 526/93, 92, 151, 153, 526/340.4

[56] References Cited

U.S. PATENT DOCUMENTS

| | | | |
|---|---|---|---|
| 3,094,514 | 6/1983 | Tucker | 260/94.3 |
| 3,135,725 | 6/1964 | Carlson et al. | 260/94.3 |
| 3,284,431 | 11/1966 | Gippin | 260/94.3 |
| 4,303,769 | 12/1981 | Odar | 526/93 |

FOREIGN PATENT DOCUMENTS

| | | |
|---|---|---|
| 716170 | 8/1965 | Canada . |
| 795860 | 10/1968 | Canada . |
| 1094248 | 1/1981 | Canada . |

*Primary Examiner*—Fred Teskin
*Attorney, Agent, or Firm*—Joseph C. Gil; Godfried R. Akorli

[57] ABSTRACT

A process for producing high cis-1,4-polybutadienes wherein there is reduced gel formation is provided which process comprises: polymerizing 1,3-butadiene in a polymerization medium comprising an inert hydrocarbon solvent and water at a temperature of from about −30° C. to about 60° C. in the presence of a catalyst system which is a mixture of (1) a substantially anhydrous divalent cobalt salt, (2) diethyl aluminum chloride or ethyl aluminum sesquichloride and (3) an organo aluminum compound of the formula $R_3Al$ wherein R is an alkyl group having from 8 to 12 carbon atoms and, optionally triethylaluminum, the molar ratio of chloride in the diethyl aluminum chloride plus (3) being from about 0.7:1 to about 1 and the molar ratio of chloride in the ethyl aluminum sesquichloride plus (3) being from about 0.7:1 to about 1.4:1 and the ratio of the mols of the divalent cobalt salt to the total mols of diethyl aluminum chloride or ethyl aluminum sesquichloride plus (3) being from about 1:15 to about 1:30, the water being employed at a level of from about 0.1 to about 0.8 millimol for every millimol of diethyl aluminum chloride or ethyl aluminum sesquichloride used, to the desired conversion.

11 Claims, No Drawings

PROCESS FOR CIS-1,4-POLYBUTADIENE PRODUCTION WITH REDUCED GEL FORMATION

FIELD OF THE INVENTION

The present invention relates to a process for the polymerization of conjugated diolefins and more particularly to a polymerization process whereby a polybutadiene having a high cis-1,4-content is produced with a reduction in gel formation.

BACKGROUND OF THE INVENTION

Processes are known for the production of polybutadienes wherein a high percentage of the 1,3-butadiene units are present in the cis-1,4-configuration. The majority of these processes are of the continuous type and involve the polymerization of 1,3-butadiene in an inert liquid polymerization medium in the presence of a homogeneous catalyst system prepared by the combination of a transition metal salt, in particular, a cobalt salt, with an $R_nAlX_{3-n}$ aluminum compound such as an alkyl aluminum dihalide or a dialkyl aluminum monohalide or mixtures thereof. However, there is a tendency for gel to be formed in addition to the high cis-1,4-polybutadiene. The gel can take the form of small suspended particles which have an adverse effect on the quality of the high cis-1,4-polybutadiene produced or the gel can be of the type that adheres to the walls of the vessels containing the polymerization mixture and to the heat transfer surfaces thereby affecting the heat transfer of the equipment necessary for proper control of the reaction. Thus the formation of gel in either form is, desirably, to be avoided.

Furthermore, with increasing environmental concerns over the use of aromatic and halogenated hydrocarbon solvents in large scale manufacturing processes, it would be advantageous if a catalyst system that does not require the use of such solvents could be developed for use in the polymerization of 1,3-butadiene to high cis-1,4-polybutadiene.

DESCRIPTION OF THE PRIOR ART

In U.S. Pat. No. 3,094,514, it is disclosed that a high molecular weight polybutadiene with more than 90 percent cis-1,4-content is produced by polymerizing 1,3-butadiene in a hydrocarbon diluent medium in the substantial absence of oxygen at a temperature between $-25°$ and $50°$ C. and in the presence of a catalyst dissolved in said hydrocarbon medium, the catalyst being prepared by combining (1) a substantially anhydrous divalent cobalt salt in the amount of at least 0.001 gram millimol of cobalt per liter of the hydrocarbon medium (2) a monoalkyl aluminum dihalide and (3) a dialkyl aluminum monohalide, the molar ratio of said monoalkyl aluminum halide to said dialkyl aluminum halide being in the range of 1:10 to 10:1 and separating the polybutadiene which does not contain more than 5 percent gel.

U.S. Pat. No. 3,135,725 discloses that a high molecular weight polybutadiene having more than 90 percent of the butadiene units present in the cis-1,4-structure can be produced by (A) polymerizing 1,3-butadiene dissolved in about 1 to 20 times its volume of an inert hydrocarbon solvent, at a temperature of about $-30°$ to about $50°$ C. in the presence of a catalyst which contains a catalytic amount of cobalt in complex combination with an alkyl aluminum chloride prepared by mixing at a temperature below $100°$ C. in a hydrocarbon solvent (1) an anhydrous cobaltous salt of the formula $CoA_2$ wherein $A_2$ represent the anion of the salt and (2) an alkyl aluminum compound of the formula $R_nAlX_{3-n}$ wherein R is an alkyl group, X is chlorine and n is an integer from 1 to 3, A being chlorine when n is 3 and (B) separating the cis-1,4-polybutadiene produced in step (A) from the hydrocarbon solvent.

In contrast to the foregoing processes, Canadian Patent Number 716,170 teaches that a process for polymerizing 1,3-butadiene to form polymers high in cis-1,4-structure, comprises contacting 1,3-butadiene with a catalyst comprising the reaction product of (1) a dihydrocarbonyl aluminum halide in which the hydrocarbonyl groups each contain from 1 to 30 carbon atoms (2) a cobalt salt and (3) oxygen, the dihydrocarbonyl aluminum halide being in the amount of from 1 to 20 millimols per 100 grams of 1,3-butadiene in the case of hydrocarbon insoluble cobalt salts and from 0.005 to 1.0 millimol per 100 grams of 1,3-butadiene in the case of hydrocarbon soluble cobalt salts, and the oxygen being supplied in the ratio of 0.05 to 1.0 millimol of oxygen per millimol of dihydrocarbonyl aluminum halide.

A further process for producing a high cis-1,3-polybutadiene is disclosed in U.S. Pat. No. 3,284,431 which comprises contacting 1,3-butadiene with a catalyst consisting of the reaction product of (1) a dihydrocarbonyl aluminum halide in which the hydrocarbonyl groups each contain from 1 to 30 carbon atoms, (2) a higher fatty acid salt of cobalt and (3) an activating agent consisting of metallic aluminum, the dihydrocarbonyl aluminum halide being present in the amount of from 1 to 100 millimols per 10 grams of butadiene, the higher fatty acid salt of cobalt being present in the amount of from 0.005 to 1.0 millimols per 100 grams of butadiene and the metallic aluminum being used in the ratio of 0.01 to 3.0 millimols of metallic aluminum per millimol of dihydrocarbonyl aluminum halide.

Canadian Patent Number 795,860 describes a process for producing a polybutadiene wherein the butadiene units are substantially all cis-1,4 in structure with the minimum formation of flocculent gel comprising intermixing a hydrocarbonyl aluminum compound with water, aging the intermixed materials for at least 30 minutes, contacting the aged intermixture with a heavy metal compound of the formula $M(A)_m$ wherein M is a heavy metal atom, A is a monovalent anion and m is the maximum valency of M, the heavy metal compound preferably being cobalt octoate, and 1,3-butadiene, and polymerizing to the desired conversion.

A solvent system for the polymerization of 1,3-butadiene that does not involve the use of an aromatic compound is described in Canadian patent number 1,094,248. The process that affords a polybutadiene 7ith a high cis-1,4-content is carried out in the presence of a catalyst of an organic cobalt compound and an aluminum alkyl compound in a solvent comprising methylene chloride and butene-1.

SUMMARY OF THE INVENTION

It is an objective of this invention to provide a process for the preparation of a high molecular weight polybutadiene having more than 96 percent of the butadiene units present in the cis-1,4-structure with a reduction in gel formation.

Thus, in accordance with the present invention, there is provided a process for producing a high molecular weight rubbery polybutadiene having more than 96 percent of the butadiene units present in the cis-1,4-structure with a reduction in gel formation, which process comprises the steps of (A) polymerizing monomeric 1,3-butadiene in a polymerization medium comprising an inert hydrocarbon solvent and water at a temperature of from about −30° C. to about 60° C. in the presence of a catalyst system dissolved in said polymerization medium, said catalyst system being a mixture of (1) a substantially anhydrous divalent cobalt salt of the formula $CoA_m$ wherein A represents a monovalent or divalent anion of the salt and m is 1 or 2; (2) an alkyl aluminum chloride compound selected from the group consisting of diethyl aluminum chloride and ethyl aluminum sesquichloride; and (3) an organo aluminum compound of the formula $R_3Al$ wherein R is an alkyl group having from 8 to 12 carbon atoms and, optionally, triethyl aluminum, the molar ratio of chloride in the diethyl aluminum chloride to the total aluminum content in the diethyl aluminum chloride (2) plus the organo aluminum compound (3) being in the range of from about 0.7:1 to about 0.95:1 and the molar ratio of chloride in the ethyl aluminum sesquichloride to the total aluminum content in the ethyl aluminum sesquichloride (2) plus the organo aluminum compound and optionally the triethyl aluminum (3) being in the range of from about 0.7:1 to about 1.4:1 and the ratio of the mols of said cobalt salt to the total mols of said alkyl aluminum chloride compound plus said organo aluminum compound and optionally triethyl aluminum being in the range of from about 1:15 to about 1:30, said water being employed at a level of from about 0.1 to about 0.8 millimols for every millimol of the alkyl aluminum chloride compound (2) used, (B) continuing the polymerization thus initiated to the monomer conversion desired, (C) thereafter deactivating the polymerization and recovering the polybutadiene.

DETAILED DESCRIPTION OF THE INVENTION

Now, in accordance with the present invention, it has been found that when 1,3-butadiene is polymerized in a polymerization medium comprising an inert hydrocarbon solvent and water by the use of a catalyst system made by combining three essential ingredients (1) a substantially anhydrous divalent cobalt salt, (2) an alkyl aluminum chloride compound and (3) an organo aluminum compound a high cis-1,4-polybutadiene is obtained and there is a reduction in gel formation. Such a catalyst system is capable of driving the polymerization to the desired conversion in a reasonable time with the production of polybutadiene having the desired microstructure, molecular weight and Mooney viscosity in addition to the reduction in gel formation.

The substantially anhydrous cobalt salts useful in the production of catalysts of this invention have the general formula $CoA_m$ wherein A is a monovalent or divalent anion and m is 1 or 2. Thus, there may be utilized any organic or inorganic acid salt such as an acetylacetonate, an acetate, a hexanoate, an octoate, an oxalate, a tartrate, a stearate, a sorbate, an adipate and a naphthenate. The anhydrous cobalt salt of choice is the salt wherein the monovalent anion A is octoate, that is the cobalt salt is cobalt dioctoate.

The alkyl aluminum chloride component that is suitable for use in the catalyst system is selected from the group consisting of diethyl aluminum chloride and ethyl aluminum sesquichloride; the ethyl aluminum sesquichloride containing approximately equimolar proportions of diethyl aluminum chloride and ethyl aluminum dichloride. Preferably the alkyl aluminum chloride used in the catalyst system is diethyl aluminum chloride.

The third component of the catalyst system used in the process of the present invention is an organo aluminum compound with the general formula $R_3Al$ wherein R is a hydrocarbon group containing from 8 to 12 carbon atoms, that functions as a modifier of the alkyl aluminum chloride compound. Groups which may be represented by R are exemplified by the straight, branched chain and cyclic aliphatic hydrocarbon groups such as 2-ethylhexyl, octyl, decyl, dodecyl, and the like. Illustrative non-limiting examples of suitable organo aluminum compounds include trioctyl aluminum, tridecyl aluminum, tridodecyl aluminum, tricyclopentyl aluminum, tricyclohexyl aluminum and the like.

In the practice of the present invention, it has been found that as the length of the hydrocarbon chain in the organo aluminum compound is increased, that is as the organo aluminum compound which is used in combination with the cobalt salt and the alkyl aluminum chloride compound to catalyze the polymerization is varied from tributyl aluminum to trihexyl aluminum to trioctyl aluminum, there is a progressive increase in the extent to which the formation of gel is suppressed in addition to the degree to which the polymerization process is controlled in that a polybutadiene having the desired microstructure, molecular weight, molecular weight distribution and Mooney viscosity is obtained. Thus, the preferred organo aluminum compounds for use in the homogeneous catalysts are trioctyl aluminum and tridecyl aluminum, most preferably trioctyl aluminum.

It should be understood in the practice of the process of this invention that when the alkyl aluminum chloride compound used as a component of the catalyst system is ethyl aluminum sesquichloride a mixture of one or more of the aforementioned organo aluminum compounds may be employed together with triethyl aluminum in order to obtain a catalyst system wherein there is the desired molar ratio of chloride to total aluminum content together with the desired molar ratio of the sterically larger group to the ethyl group.

While not wishing to be bound by any theories, it is believed that a certain number of ethyl groups must be present in order for reduction of the divalent cobalt from a valency of two to a valency of one to occur, the presence of large amounts of organo aluminum compounds wherein there are sterically large groups hindering this reduction process. Thus, in order to obtain a particular chloride to total aluminum content together with a particular molar ratio of a sterically larger group to the ethyl group, the use of a mixture of two organo aluminum compounds, one of which is triethyl aluminum may be necessary.

It should be noted that it has been found that the degree of activity of the catalyst slowly decreases as the molar ratio of the sterically larger group in the organo aluminum compound to the ethyl group is increased from about 1:1 to about 9:1 (albeit whether the ethyl group contribution to the molar ratio is from the alkyl aluminum compound alone or whether the ethyl group contribution is from both the alkyl aluminum chloride compound and triethyl aluminum).

In the catalyst systems of this invention the molar ratio of the amount of chloride in the alkyl aluminum chloride compound to the total amount of aluminum in the alkyl aluminum compound and the organo aluminum compound and optionally triethyl aluminum is of particular importance in order to ensure that when the catalyst is employed in the polymerization process, there is substantially no gel formed during the production of the high cis-1,4-polybutadiene. When the alkyl aluminum compound used as one of the components of the catalyst system is diethyl aluminum chloride, the molar ratio of the amount of chloride in the diethyl aluminum chloride to the total aluminum content in the diethyl aluminum chloride plus the organo aluminum compound should be in the range of from about 0.7:1 to about 0.95:1, preferably in the range of from about 0.8:1 to about 0.9:1. However, when the alkyl aluminum chloride compound employed as one of the components of the catalyst system is ethyl aluminum sesquichloride, the molar ratio of the amount of chloride in the ethyl aluminum sesquichloride to the total aluminum content in the ethyl aluminum sesquichloride, the organo aluminum compound and optionally triethyl aluminum should be in the range of from about 0.7:1 to about 1.4:1, preferably in the range of from about 0.8:1 to about 1.3:1.

While the relative proportions of the cobalt and total aluminum content, that is the molar ratio of cobalt to aluminum, is not critical in so far as the polymer structure is concerned, it is important in determining the solution viscosity of the polymeric mixture. Thus, the process of the present invention is carried out wherein the ratio of the mols of the divalent cobalt salt to the total mols of the alkyl aluminum chloride compound plus the organo aluminum compound and optionally triethyl aluminum is in the range of from about 1:15 to about 1:30, preferably in the range of from about 1:15 to about 1:20.

The process of the present invention is carried out in a polymerization medium containing an inert hydrocarbon which is a solvent at least for the monomer, 1,3-butadiene and the catalyst system. Suitable inert hydrocarbons for use as the polymerization medium include aliphatic, cycloaliphatic, aromatic and monoolefinic hydrocarbons and mixtures thereof. More specifically suitable hydrocarbons are those selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_4$ to $C_6$ monoolefinic hydrocarbons and mixtures thereof. Illustrative nonlimiting examples of the aforementioned hydrocarbons include butane, pentane, hexane, heptane, cyclopentane, cyclohexane, benzene, toluene, xylene, butene-1 and pentene-1. It has been found that the process of the present invention can be carried out in a polymerization medium that does not contain an aromatic hydrocarbon, that is the process can be carried out in hydrocarbons selected from the group consisting of $C_4$ to $C_8$ aliphatic hydrocarbons, $C_5$ to $C_{10}$ cyclic aliphatic hydrocarbons and $C_4$ to $C_6$ monoolefinic hydrocarbons and mixtures thereof without the rate of polymerization of the 1,3-butadiene and the dilute solution viscosity, the linearity and Mooney viscosity of the product polybutadiene being affected.

The concentration of 1,3-butadiene in the polymerization medium can vary depending on the particular solvent or diluent medium employed. In most solvents in which both the 1,3-butadiene and the product polymer are completely soluble, from about 15 to 35 percent by weight of 1,3-butadiene, based on the total weight of the mixture can be employed with the production of a flowable cement.

Also present in the polymerization medium is a small amount of water which typically is present in the polymerization medium at about 0.1 to about 0.8 millimols for every millimol of the alkyl aluminum chloride compound used. The exclusion of moisture and oxygen is most easily effected by maintaining an inert, dry atmosphere such as nitrogen, argon or helium over the liquid when preparing the reaction mixture and carrying out the polymerization.

In carrying out the polymerization process, it is desirable that pure water, that is water not dissolved in the polymerization medium, should not be brought into contact with the organo aluminum compounds. Preferably, the water is dissolved in the polymerization medium, in the 1,3-butadiene or in a combination of them together with a molecular weight modifier such as 1,5-cyclooctadiene or 1,2-butadiene.

While the catalyst components may be added in any order to the reaction medium, it is preferable to add at least a portion of the mixture of the alkyl aluminum compound and the organo aluminum compound to a mixture of the solvent and/or 1,3 butadiene wherein there is water dissolved and to agitate the mixture under an inert atmosphere for a period of time of from about 1 minute to about 30 minutes in order to permit the organo aluminum modified alkyl aluminum chloride compound to scavenge impurities, prior to the addition of the cobalt salt to the reaction mixture. However, although mixing of the organo aluminum compound and the alkyl aluminum chloride compound with the water for a period of time prior to combination with the third component, the cobalt salt, of the catalyst system is preferable, it is not essential to the practice of the present invention.

The temperature at which the process of the present invention can be carried out is in the range of from about $-30°$ C. to about $60°$ C., the lower temperature limit being dictated more by the freezing point of the reaction medium rather than by the catalyst activity. Normally the process of the present invention is conducted within a temperature range of from about $-10°$ to about $40°$ C.

In accordance with the process of this invention, a high molecular weight polybutadiene having more than 96 percent of the butadiene units present in the cis-1,4-configuration is produced with a reduction in gel formation by polymerizing, in a reaction vessel provided with agitation, 1,3-butadiene dissolved in a polymerization medium comprising an inert hydrocarbon solvent and water in the presence of a catalyst system comprising (1) a substantially anhydrous divalent cobalt salt, (2) an alkyl aluminum chloride compound and (3) an organo aluminum compound and optionally triethyl aluminum. Generally the concentration of 1,3-butadiene in the reactor as a weight percentage of the total solution present ranges from about 15 to about 35 weight percent and the polymerization process is carried out at a temperature of from about $-30°$ C. to about $60°$ C.

The polymerization may be carried out as a batchwise polymerization or as a continuous polymerization, the continuous polymerization being preferred with 1,3-butadiene and the catalyst being continuously supplied to the reactor.

Without limiting in any way the scope of the invention, the process of the present invention may consist of combining 1,3-butadiene with a mixture of inert hydrocarbons that comprise the polymerization medium and treating the resulting mixture to yield a substantially anhydrous mixture prior to incorporating therein the required amount of water in solution form. To this combination, there is then added a solution of an alkyl aluminum chloride compound and an organo aluminum compound. Following thorough agitation and a period of aging (if desired) the solution mixture can conveniently be introduced to one or a series of reaction vessels where the polymerization takes place. The divalent cobalt salt may be added following the mixing of the water with the solution containing the 1,3-butadiene or directly where the polymerization is to occur.

After the polymerization has reached the desired degree of conversion, the reaction mixture is treated with an agent that deactivates the catalyst, such agents being selected from water, alcohol and the like. Catalyst residues may be removed by water washes, alcohol washes and the like. The polymer may simultaneously be precipitated by the addition of alcohol or alcohol solvent mixtures that both destroy the catalyst and precipitate the polymer as a solid crumb which may be further washed with water or alcohol and subsequently dried by methods well known in the art.

In the examples which illustrate the practice of this invention, the analytical techniques below were employed for the analysis of the high cis-1,4-polybutadienes produced. Molecular weight determinations were made by Gel Permeation Chromatography (GPC) using a Waters gel permeation chromatograph equipped with a differential refractive index (DRI) detector, the instrument being calibrated with polystyrene standards having a narrow molecular weight distribution. The system was operated at ambient temperature using three linear columns packed with Styrogel ® and tetrahydrofuran as the mobile phase.

The weight percentages of the cis-1,4-, the trans-1,4- and the vinyl-1,2-structures in the polybutadiene products were determined by Fourier Transform Infra Red (FTIR) Spectroscopy using polymeric films cast from solution on to potassium bromide plates. The areas of the absorbance peaks at 995 $cm^{-1}$, 968 $cm^{-1}$, 912 $cm^{-1}$, 895 $cm_{-1}$ and 740 $cm^{-1}$ were integrated and the weight percentages of the cis-1,4-, trans-1,4- and vinyl-1,2- structures were then determined from empirically derived relationships.

The Mooney viscosity of the product was determined according to ASTM method D-1646 and the dilute solution viscosity was obtained according to a modified version of ASTM method D-3616 wherein the amount of sample used in the preparation of the polymeric solution was 0.3000±0.02 grams and the flow times of the polymeric solution and the solvent were determined at a temperature of 30°±0.02° C. The linearity of the product was determined using the equation $$\text{Linearity} = \frac{\text{Dilute solution viscosity}}{\left[\frac{\text{Mooney}}{3.50}\right] \times 0.3623}$$

The wet gel and dry gel content of the high cis-1,4-polybutadienes produced in the process of this invention were determined using the following procedure. A known weight of the polymer sample was dissolved in styrene, any gel present in the polymer being swollen by styrene solvent absorption. The wet (swollen) gel is then isolated via filtration through a metallic screen, weighed and the parts per million of wet gel calculated. The screen containing the wet gel is then placed in a vacuum oven to drive off any excess styrene, after which time the screen and remaining dry gel are then cooled, weighed and the parts per million of dry gel calculated. The ratio of wet gel to dry gel is calculated, affording the swelling index.

1,3-Butadiene obtained from Union Carbide and Phillips pure grade cyclohexane and butene-1 were all purified by passage through a column packed with 4 Å molecular sieves, followed by passage through a column packed with 13 X molecular sieves. 1,5-Cyclooctadiene obtained as a 20 weight percent solution in cyclohexane from the Aldrich Chemical Company was used as received. A molar solution of diethyl aluminum chloride in hexane and a 20 weight percent solution of ethyl aluminum sesquichloride in hexane obtained from Ethyl Corporation were used as received. Cobalt dioctoate obtained from Witco or Nuodex and the trialkyl aluminums obtained from either Ethyl Corporation or Akzo (Texas Alkyls Division) were also used as received.

The following examples are intended to illustrate specific embodiments of the invention and are not intended to limit the scope of the invention.

EXAMPLE 1

This example demonstrates the polymerization of 1,3-butadiene using a catalyst system wherein the length of the hydrocarbon chain in the organo aluminum compound is varied in a solvent system that does not contain an aromatic or halogenated hydrocarbon. Solutions of diethyl aluminum chloride and the various organo aluminum compounds for use in the polymerization were prepared in the following manner.

A 1.0 molar solution of diethyl aluminum chloride in hexane (80 ml, 0.08 mol) was mixed with a 25.0 weight percent solution of tributyl aluminum in heptane (15.87 g, 0.02 mol) under an atmosphere of argon to give a solution of a mixture having an average composition of $Et_{1.6}Bu_{0.6}Al_{1.0}Cl_{0.8}$.

A 1.0 molar solution of diethyl aluminum chloride in hexane (80 ml, 0.08 mol) was mixed together with a 25.1 weight percent solution of trihexyl aluminum in heptane (22.5 g, 0.02 mol) under an atmosphere of argon to give a solution of a mixture having an average composition of $Et_{1.6}Hex_{0.6}Al_{1.0}Cl_{0.8}$.

A 1.0 molar solution of diethyl aluminum chloride in hexane (80 ml, 0.08 mol) was mixed together with a 25.3 weight percent solution of trioctyl aluminum in heptane (28.98 g, 0.02 mol) under an atmosphere of argon to afford a solution of a mixture having an average composition of $Et_{1.6}Oct_{0.6}Al_{1.0}Cl_{0.8}$.

A solution of a mixture having an average composition of $Et_{2.2}Al_{1.0}Cl_{0.8}$ for use in the control reaction was prepared by mixing a 1.0 molar solution of diethyl aluminum chloride in hexane (80 ml, 0.08 mol) with a solution of triethyl aluminum (15.53 g, 0.02 mol) in heptane under an atmosphere of argon to afford a solution of a mixture having an average composition of $Et_{2.2}Al_{1.0}Cl_{0.8}$.

A series of polymerizations of 1,3-butadiene in a solvent system of cyclohexane and butene-1 under an argon atmosphere utilizing the three component catalyst made up of substantially anhydrous cobalt dioctoate, (2) diethyl aluminum chloride and (3) various trialkyl aluminums were carried out in bottles. In each experiment a 1 liter glass bottle capped with a two hole crown cap sealed with a fluorinated rubber gasket was charged with cyclohexane (150.0 g), butene-1 (84.0 g), water (0.24 ml, 1.22 millimol), 1,5 cyclooctadiene (4.0 ml) and 1,3-butadiene (72.0 g, 1.33 mol) (23 percent by weight of 1,3-butadiene based on the weight of the total solution) and the bottle shaken in a water bath at a temperature of 20° C. for 10 minutes. To the solution, there was then added the solution of the mixture of diethyl aluminum chloride and the organo aluminum (3.5 millimol) and the bottle containing the resultant solution shaken for a further 10 minutes in the water bath at a temperature of 20° C. prior to the addition of a 0.87 weight percent solution of cobalt dioctoate in hexane (0.22 ml, 0.0067 mol). Polymerization was allowed to take place for 30 minutes at a temperature of 20° C., at the end of which time the reaction mixture was treated with a mixture of methanol and water in order to deactivate the catalyst and coagulate the polybutadiene. The polybutadiene was then dried in an oven under vacuum at a temperature of 60° C. for 24 hours. The results for the separate experiments are given in Table I.

From the results in Table I, it can be seen that the use of a catalyst system wherein there is a mixture of diethyl aluminum chloride with a long chain trialkyl aluminum does not affect the properties of the high cis-1,4-polybutadiene produced in the polymerization process and thus it is possible to polymerize 1,3-butadiene using the process of the present invention in a solvent system that does not contain either an aromatic hydrocarbon or a halogenated hydrocarbon.

EXAMPLE 2

A continuous polymerization reaction was run in a polymerization system consisting of a mixing vessel connected to a series of two stirred reactors each fitted with an evaporative cooling coil. A feedstock solution was prepared by dissolution of 1,3-butadiene in a solvent mixture of butene-1, cyclohexane and benzene to provide 30 weight percent of 1,3-butadiene in the solvent mixture. This feedstock solution was then mixed with benzene containing the desired amount of dissolved water and the resulting feedstock introduced in a continuous manner into the mixing vessel. Also added to the mixing vessel was an appropriate amount of a solution of diethyl aluminum chloride and trioctyl aluminum in the molar ratio of 9:1 in benzene. The contents of the mixing vessel were maintained at a temperature of 25° C. for an average residence time of 20 minutes and then fed continuously into the first of the two reactors in series, together with a solution of the desired amount of cobalt dioctoate in benzene. The continuous polymerization was at a pressure of about 10 psig and a temperature of approximately 25° C. The reaction recipe based on 100 parts by weight of 1,3-butadiene was:

| | |
|---|---|
| 1,3-butadiene | 100 |
| diethyl aluminum chloride/trioctyl aluminum | 0.08 |
| cobalt dioctoate | 0.003 |
| water | 0.005 |

The reaction product was deactivated with methanol and the polybutadiene was recovered by coagulation with water, washed and dried. The run was continued over a period of approximately 60 hours, the polybutadiene produced being sampled periodically for the presence of gel. These results together with analytical data on the molecular weight and Mooney viscosity are given in Table II.

A control polymerization reaction was carried out in a similar manner with the exception that a solution of the appropriate amount of diethyl aluminum chloride ($Et_{2.0}Al_{1.0}Cl_{1.0}$) in benzene was added to the feedstock solution of 1,3-butadiene dissolved in a mixture of butene-1, cyclohexane, benzene and water, in the mixing vessel, prior to polymerization being initiated in the first of the series of two reactors by the addition of the solution of the appropriate concentration of cobalt dioctoate. The polybutadiene produced was analyzed for the presence of gel and these results together with analytical data on the molecular weight and Mooney viscosity are given in Table II.

From the results in Table II, it can be seen that when a mixture of diethyl aluminum chloride and trioctyl aluminum is employed as the cocatalyst instead of diethyl aluminum chloride the amount of wet gel present in the product polybutdiene is reduced significantly. Moreover, the polybutadiene is almost identical in molecular weight and Mooney viscosity to that obtained when the cocatalyst diethyl aluminum chloride is not mixed with trioctyl aluminum in an appropriate ratio.

TABLE I

| | Mn | Mw | DSV | Mooney (ML 1 + 4 @ 100° C.) | Linearity | Structure % cis | % trans | % vinyl |
|---|---|---|---|---|---|---|---|---|
| $Et_{2.2}Al_{1.0}Cl_{0.8}$* | 72,700 | 262,730 | 1.61 | 28.2 | 0.76 | 97.6 | 0.9 | 1.5 |
| $Et_{1.6}Bu_{0.6}Al_{1.0}Cl_{0.8}$ | 76,150 | 283,110 | 1.69 | 32.4 | 0.75 | 97.4 | 1.1 | 1.5 |
| $Et_{1.6}Hex_{0.6}Al_{1.0}Cl_{0.8}$ | 77,000 | 285,860 | 1.72 | 32.4 | 0.77 | 97.5 | 1.0 | 1.5 |
| $Et_{1.6}Oct_{0.6}Al_{1.0}Cl_{0.8}$ | 77,260 | 285,230 | 1.94 | 31.9 | 0.87 | 97.6 | 1.0 | 1.4 |

*Control

TABLE II

| | Mn | Mw | Mooney (ML 1 + 8 @ 100° C.) | Wet Gel (ppm) Sample No. 1 | 2 | 3 | 4 |
|---|---|---|---|---|---|---|---|
| $Et_{1.8}Oct_{0.3}Cl_{0.9}$ | 100,510 | 372,530 | 42.5 | 87 | 71 | 82 | 82 |
| $Et_{2.0}Al_{1.0}Cl_{1.0}$* | 86,490 | 356,080 | 42.0 | 136 | 120 | 164 | 224 |

*Control

What is claimed is:

1. A process for producing a high molecular weight rubbery polybutadiene having more than 96 percent of the butadiene units present in the cis-1,4-structure with a reduction in gel formation, which process comprises the steps of (A) polymerizing monomeric 1,3-butadiene in a polymerization medium comprising an inert hydrocarbon solvent and water at a temperature of from about −30° C. to about 60° C. in the presence of a catalyst system dissolved in said polymerization medium, said catalyst system being a mixture of (1) a substantially anhydrous divalent cobalt salt of the formula $CoA_m$ wherein A represents a monovalent or divalent anion of the salt and m is 1 or 2; (2) an alkyl aluminum chloride compound selected from the group consisting of diethyl aluminum chloride and ethyl aluminum sesquichloride; and (3) an organo aluminum compound of the formula $R_3Al$ wherein R is an alkyl group having from 8 to 12 carbon atoms and optionally triethyl aluminum, the molar ratio of chloride in the diethyl aluminum chloride to the total aluminum content in the diethyl aluminum chloride (2) plus the organo aluminum compound (3) being in the range of from about 0.7:1 to about 0.95:1 and the molar ratio of chloride in the ethyl aluminum sesquichloride to the total aluminum content in the ethyl aluminum sesquichloride (2) plus the organo aluminum compound and optionally the triethyl aluminum (3) being in the range of from about 0.7:1 to about 1.4:1 and the ratio of the mols of said divalent cobalt salt to the total mols of said alkyl aluminum chloride compound plus said organo aluminum compound and optionally triethyl aluminum being in the range of from about 1:15 to about 1:30, said water being employed at a level of from about 0.1 to about 0.8 millimol for every millimol of the alkyl aluminum chloride compound (2) used, (B) continuing the polymerization thus initiated to the monomer conversion desired, and (C) thereafter deactivating the polymerization and recovering the polybutadiene.

2. The process of claim 1 wherein the anion A of the divalent cobalt salt $CoA_m$ is selected from the group consisting of an acetylacetonate, adipate, a hexanoate, octoate, naphthenate, oxalate, tartrate, stearate and sorbate.

3. The process of claim 2 wherein the anion A of the divalent cobalt salt $CoA_m$ is octoate and m is 2.

4. The process of claim 1 wherein the molar ratio of the amount of chloride in the diethyl aluminum chloride to the total aluminum content in the diethyl aluminum chloride plus the organo aluminum compound is in the range of from about 0.8:1 to about 0.9:1.

5. The process of claim 1 wherein the molar ratio of the amount of chloride in the ethyl aluminum sesquichloride to the total aluminum content in the ethyl aluminum sesquichloride plus the organo aluminum compound and optionally triethyl aluminum is in the range of from about 0.8:1 to about 1.4:1.

6. The process of claim 1 wherein the organo aluminum compound is selected from the group consisting of trioctyl aluminum and tridecyl aluminum.

7. The process of claim 6 wherein the organo aluminum compound is trioctyl aluminum.

8. The process of claim 1 wherein the ratio of the mols of the divalent cobalt salt to the total mols of said alkyl aluminum chloride compound and said organo aluminum compound and optionally triethyl aluminum is in the range of from about 1:15 to about 1:20.

9. The process of claim 1 wherein the inert hydrocarbon solvent is selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_4$ to $C_6$ monoolefinic hydrocarbons and mixtures thereof.

10. The process of claim 9 wherein the inert hydrocarbon solvent is selected from the group consisting of $C_4$ to $C_8$ aliphatic hydrocarbons, $C_5$ to $C_{10}$ cyclic aliphatic hydrocarbons, $C_4$ to $C_6$ monoolefinic hydrocarbons and mixtures thereof.

11. The process of claim 1 which process comprises the steps of (A) polymerizing monomeric 1,3-butadiene in a polymerization medium comprising an inert hydrocarbon solvent selected from the group consisting of $C_4$ to $C_8$ aliphatic hydrocarbons, $C_5$ to $C_{10}$ cyclic aliphatic hydrocarbons, $C_4$ to $C_6$ monoolefinic hydrocarbons and mixtures thereof and water at a temperature of from about $-30°$ C. to about $60°$ C. in the presence of a catalyst system dissolved in said polymerization medium, said catalyst system being a mixture of (1) a substantially anhydrous divalent cobalt salt of the formula $CoA_m$ wherein the anion A is octoate and m is 2, (2) diethyl aluminum chloride and (3) trioctyl aluminum, the molar ratio of chloride in said diethyl aluminum chloride to the total aluminum content in said diethyl aluminum chloride plus said trioctyl aluminum being in the range of from 0.8:1 to about 0.9:1 and the ratio of the mols of said divalent cobalt salt to the total mols of said diethyl aluminum chloride and said trioctyl aluminum being in the range of from about 1:15 to about 1:20, said water being employed at a level of from about 0.1 to about 0.8 millimol for every millimol of the diethyl aluminum chloride used, (B) continuing the polymerization thus initiated to the monomer conversion desired, and (C) thereafter deactivating the polymerization and recovering the polybutadiene.

* * * * *